United States Patent
Hamalainen et al.

(10) Patent No.: US 7,437,160 B2
(45) Date of Patent: Oct. 14, 2008

(54) CONTROL OF INTERFREQUENCY HANDOVERS

(75) Inventors: Seppo Hamalainen, Espoo (FI); Antti Lehtonen, Helsinki (FI); Aku Vuoti, Naantali (FI); Jens-Ulrik Petersen, Tochigi (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/516,641

(22) PCT Filed: May 14, 2003

(86) PCT No.: PCT/FI03/00370

§ 371 (c)(1),
(2), (4) Date: May 26, 2005

(87) PCT Pub. No.: WO03/103324

PCT Pub. Date: Dec. 11, 2003

(65) Prior Publication Data

US 2005/0277415 A1 Dec. 15, 2005

(30) Foreign Application Priority Data

May 31, 2002 (FI) .................................. 20021030

(51) Int. Cl.
*H04Q 7/20* (2006.01)

(52) U.S. Cl. ..................... 455/436; 455/437; 455/439; 455/522; 455/69; 455/561; 455/442; 455/443

(58) Field of Classification Search ......... 455/436–439, 455/522, 69, 442, 443
See application file for complete search history.

(56) References Cited

U.S. PATENT DOCUMENTS 6,081,714 A * 6/2000 Wakizaka ................... 455/437
6,385,437 B1 * 5/2002 Park et al. ..................... 455/69
6,738,646 B2 * 5/2004 Miyoshi et al. ............. 455/561
6,807,429 B2 * 10/2004 Subrahmanya .............. 455/522
6,850,770 B2 * 2/2005 Hwang ........................ 455/522
2001/0008521 A1 7/2001 Virtanen
2002/0027890 A1 3/2002 Bernstein et al.
2002/0126739 A1 * 9/2002 Tiedemann et al. ......... 375/141
2002/0173329 A1 * 11/2002 Hwang ........................ 455/522
2003/0003942 A1 * 1/2003 Okumura .................... 455/522

FOREIGN PATENT DOCUMENTS

| EP | 0946076 | 9/1999 |
|---|---|---|
| EP | 0984581 | 3/2000 |
| FI | 109862 | 8/2002 |
| GB | 2314734 | 1/1998 |
| WO | WO 0131958 | 5/2001 |
| WO | WO 02062093 | 8/2002 |

* cited by examiner

*Primary Examiner*—David Q Nguyen
(74) *Attorney, Agent, or Firm*—Ware, Fressola, Van Der Sluys & Adolphson, LLP

(57) ABSTRACT

A method and a mobile station for controlling interfrequency handovers of the mobile station is provided. The target value for a quality factor of the received downlink signal is used in determining a need for an interfrequency handover. The target value of the handover control method may be equal to the target value of the downlink outer loop power control, or target value of handover control may depend on the target value of the downlink outer loop power control. As the target value of the downlink outer loop power control is updated, the target value of the handover control is typically updated, too. The same target values, or values that depend on the downlink outer loop power control target values, for example, via a known function, are used in controlling interfrequency handovers. A method according to the preferred embodiments of the invention detects this situation and preparations for an interfrequency handover are typically initiated.

24 Claims, 14 Drawing Sheets

CONTROL OF INTERFREQUENCY HANDOVERS

CROSS REFERENCE TO RELATED APPLICATIONS

This application is for entry into the U.S. national phase under 371 for International Application No. PCT/FI03/000370 having an international filing date of May 14, 2003, and from which priority is claimed under all applicable sections of Title 35 of the United States Code including, but not limited to, Sections 120, 363 and 365(c), and which in turn claims priority under 35 USC § 119 to Finnish Patent Application No. 20021030 filed on May 31, 2002.

TECHNICAL FIELD

The invention relates in general to handovers in cellular radio network. In particular the invention relates to controlling interfrequency handovers.

BACKGROUND OF THE INVENTION

In cellular networks, where the communication connections are separated from each other using code division multiple access (CDMA) technique, a mobile station having an active communication connection with the cellular network should be able to receive data at the radio frequency related to that communication connection practically all the time. In an interfrequency handover the frequency on which an active communication connection exists is changed. A cell change may accompany the interfrequency handover, in which case the maneuver is an intercell-interfrequency handover, or the frequency change may take place within a single cell meaning that an intracell-interfrequency handover is performed. The present invention is equally applicable to all interfrequency handover types. Furthermore, the present invention is also applicable to intersystem handovers, where a handover is made from a first cellular system employing CDMA to a second cellular system employing TDMA (Time Division Multiple Access). A handover from a Wideband CDMA system to GSM (Global System for Mobile Communications) is an example of such handover.

In order to find a suitable target frequency for an interfrequency handover the mobile station must evaluate the available target frequencies in terms of connection quality that it could achieve on them. This in turn necessitates that the mobile station must quickly tune its radio receiver (or one of its radio receivers, in case it comprises several of them) onto each target frequency to be evaluated for a certain period of time. In TDMA systems this is not a problem since the mobile terminal must anyway transmit and receive only during certain typically cyclically occurring time intervals, between which it has time to tune its receiver onto whatever other frequencies it wants. However, in other systems like CDMA (Code Division Multiple Access) where reception and transmission are substantially continuous, it may be problematic to find suitable time intervals for the measurements.

Typically data is transmitted over the radio interface in frames, which have a certain number of time slots. The time slots comprise a certain number of symbols. The number of time slots in a frame, the number of symbols in a time slot and the duration of a symbol are usually defined in the applicable cellular system specifications.

It is known to define and employ a slotted mode (or compressed mode) for transmission and reception in order to leave certain time intervals free for measurement purposes. Slotted mode means that both transmission and reception are performed only according to a certain predefined slot pattern. FIG. 1 illustrates a set of frame chains of which frame chain 101 corresponds to uplink transmission in normal mode, frame chain 102 corresponds to downlink transmission in normal mode, frame chain 103 corresponds to uplink transmission in slotted mode and frame chain 104 corresponds to downlink transmission in slotted mode. The relative lengths of the slotted frames and the silent periods between them are defined in the applicable system specifications. The frames in the slotted mode may carry the same amount of user data as frames in the continuous mode or less user data than frames in the continuous mode. Typically the uplink and downlink silent periods are at the same time. FIG. 1 shows an example, where the silent periods in the uplink and downlink direction occur at different times.

In a single-receiver station slotted receiving is considerable in order to reserve the receiver to the use of the ongoing connection for only a part of the time. Slotted transmitting is not that considerable at first sight, but usually it can be required or even it can be unavoidable since the transmitter should be substantially powered down for those time periods when the receiver is measuring.

An interfrequency handover typically improves the quality of a communication connection, when the handover is made to a target frequency, for which there is not present a radio transmitter (source of interference) at an adjacent frequency. As preparatory measurements relating to a handover at available target frequencies typically require slotted mode, they may cause interference to other communication connections employing the own frequency. A method, where a need for measurements relating to an interfrequency handover is detected reliably, is therefore needed.

Need for an interfrequency handover may be detected by determining the quality of the current communication connection or by estimating adjacent channel interference, for example, interference caused by a radio transmission at an adjacent frequency, at the own frequency. It is possible to determine the quality of the current communication connection or to estimate adjacent channel interference from measurement in the own frequency in the continuous mode. The estimation of adjacent channel interference is described, for example, in a patent publication WO 01/31958 A1. Such measurements at the own frequency do not cause interference to other communication connections employing the same frequency. Once the quality of the communication connection is determined or the adjacent channel interference is estimated, it is typically compared to a predetermined threshold value to determine, whether there is need to initiate preparatory measurements at available target frequencies. A proper threshold value for initiating preparatory measurements may vary, and it is not necessarily easy or straightforward to determine suitable threshold values.

SUMMARY OF THE INVENTION

An object of the invention is to provide a flexible and straightforward method for controlling interfrequency handovers.

Objects of the invention are achieved by comparing the quality of the communication connection to a target value based on an interference control of the communication connection. The target value depends on the quality target value used in downlink outer loop power control of the communication connection.

In accordance with a first aspect of the invention, there is provided a method for controlling interfrequency handovers of a mobile station, the mobile station comprising a continuous communication mode and a combined slotted communication mode and measurement mode, the method comprising the steps of:

changing an operation of the mobile station into the combined slotted communication mode and measurement mode for preparing an interfrequency handover, if at least a criterion specifying that a quality of a downlink signal relating to a channel on which communication takes place between the mobile station and a mobile communication system in the continuous communication mode is worse than a quality represented by a first target value, is fulfilled, wherein the first target value depends on a second target value, the second target value being related to an outer loop power control of a transmission power of the downlink signal.

In accordance with a second aspect of the invention, there is provided a mobile station arranged to contain a continuous communication mode and a combined slotted communication and measurement mode, the mobile station comprising means for determining a value for a quality factor for a received downlink signal, means for controlling the communication mode of the mobile station, means for controlling interfrequency handovers, said means for controlling interfrequency handover being arranged to compare the determined quality factor value to a first target value for performing the interfrequency handover, downlink power control means arranged to compare the determined quality factor value to a second target value and to generate power control commands based on the comparison, the first target value being arranged to depend on the second target value and the second value being arranged to relate to an outer loop power control of a transmission power of the downlink signal.

Preferably, the outer loop based power control manner comprises an outer loop power control for controlling the quality of the connection by setting the target value for an inner loop of a closed loop power control.

According to the preferred embodiments of the invention, the target value for a quality factor of the received downlink signal is used in determining a need for an interfrequency handover. The target value of the handover control method may be equal to the target value of the downlink outer loop power control, or target value of handover control may depend on the target value of the downlink outer loop power control. As target value of the downlink outer loop power control is updated, the target value of the handover control is typically updated, too.

According to another embodiment of the invention the target value of the handover control method may be equal to the maximum downlink transmission power allocated for the user, or the target value of the handover control may depend on the (maximum) downlink transmission power allocated for the user.

According to yet another embodiment of the invention the target value of the handover control method may be equal to a target value for the maximum uplink transmission power allocated for the user that is based on open loop power control, or the target value of the handover control may depend on the (maximum) uplink transmission power allocated for the user that is based on open loop power control. The uplink power of the mobile station is set to depend on the received pilot power or quality. If the quality is not adequate, the power should be increased. This may imply need for the IFHO because the quality is not adequate, for example because of adjacent channel interference.

According to yet another embodiment for the outer loop power control, the second target value represents BLER (Block Error Rate)/FER (Frame Error Rate)/BER (Bit Error Rate) target value for the outer loop power control. The first target value comprises a function of the second target value, and the quality refers to the BLER/FER/BER measurement.

According to yet another embodiment for the outer loop power control, the second target value represents SIR (Signal to Interference Ratio) target which is obtained from the outer loop power control. The first target value comprises a function of the second target value, and the quality refers to the SIR measurement.

Power control is a very important feature in CDMA systems. Therefore, suitable target values for quality factors used in power control are determined carefully. Advantage of this effort may be taken by using the same target values, or values that depend on the downlink outer loop power control target values, for example, via a known function, in controlling interfrequency handovers. There typically is strong adjacent channel interference near a radio transmitter employing an adjacent frequency, and the target value of the quality factor may not be reached near such a transmitter. A method according to the preferred embodiments of the invention detects this situation and preparations for an interfrequency handover are typically initiated.

Simulation results show that a method according to the preferred embodiments of the invention provides efficiency. In a situation, where an area is covered by two cellular networks, the interfrequency handovers of a mobile station communicating with a first cellular network take place near a base station of the second cellular network. This means that a method according to the preferred embodiments of the invention efficiently aid in escaping adjacent channel interference. Furthermore, there are practically no interfrequency handovers farther away from the base station of the second cellular network. A method according to the preferred embodiments do not cause unnecessary interfrequency handovers, at least not when a load in a cellular network is moderate.

The invention itself both as to its implementation and its method of operation, together with additional objects and advantages thereof, will be best understood from the following description of specific embodiments when read in connection with the accompanying drawings.

DETAILED DESCRIPTION

Figure 1:
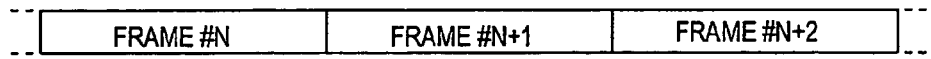
FIG. 1 illustrates the known concept of slotted mode.
Figure 1:
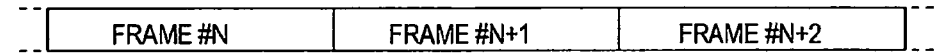
Figure 1:
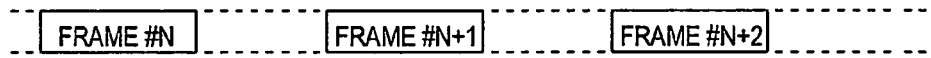
Figure 1:

FIG. 1 has been discussed in the description of prior art, so the following description of the embodiments of the invention will focus on FIGS. 2-12. Same reference designators in the drawings relate to similar parts.

Some embodiments of the invention relates to the power control of the communication connection between the mobile station and the network.

Figure 2:
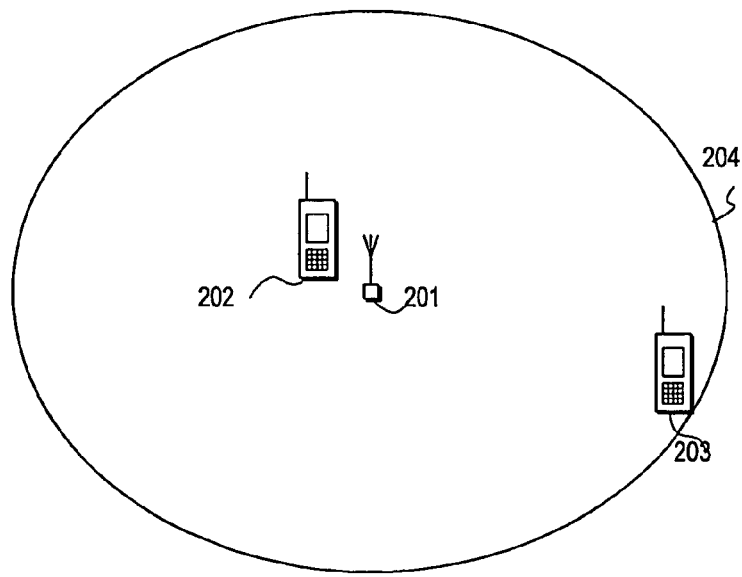
FIG. 2 presents some considerations related to transmission power control.

FIG. 2 illustrates schematically a base station 201 and two mobile stations 202 and 203 of a CDMA-based cellular radio system. The cell or radio coverage area of the base station 201 is shown as an ellipse 204. The first mobile station 202 is relatively close to the base station 201, so relatively low transmission power is sufficient for active communication therebetween. The second mobile station 203 is near the cell border, so a much higher transmission power level must be employed both in the mobile station 203 and the base station 201 to ensure the quality of the communication connection therebetween. Transmission power control functions that are known as such are used to control the transmission power both at the base station and at the mobile station in order to take into account the current distance therebetween and the resulting attenuation of radio signals. The operator who is responsible for the cellular radio system tries to dimension the cells so that maximal transmission power should not be needed unless the mobile station is very near to the cell border.

Figure 3A:
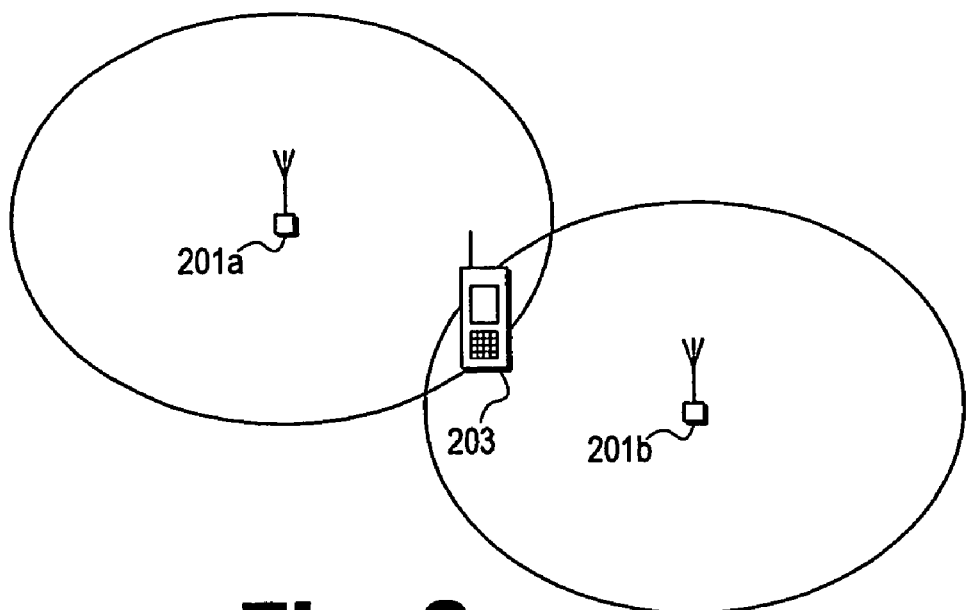
FIG. 3a presents some considerations related to overlapping co-channel cells.

FIG. 3a illustrates schematically a situation where two base stations 201a and 201b of the same CDMA-based cellular radio system have partially overlapping cells. CDMA-based cellular radio systems are basically so-called single-frequency systems where the substantially same transmission frequency may be used in the cells of both base stations 201a and 201b. Transceivers within a cell interfere each other as well as users in other cells. One aim in selecting codes is that in reception, when decorrelating with a desired user code, interfering signal corresponding to a code having low correlation with the desired user code, remains widespread, while the signal corresponding to the desired user code becomes a narrowband signal. In practical CDMA systems there are multiple transmission frequencies in use in most cells, but they form kind of overlayed single-frequency networks: in the absence of excessive interference on a certain frequency a mobile station 203 that is about to change cells does not have to care about more than a substantially single communication frequency.

Figure 3B:
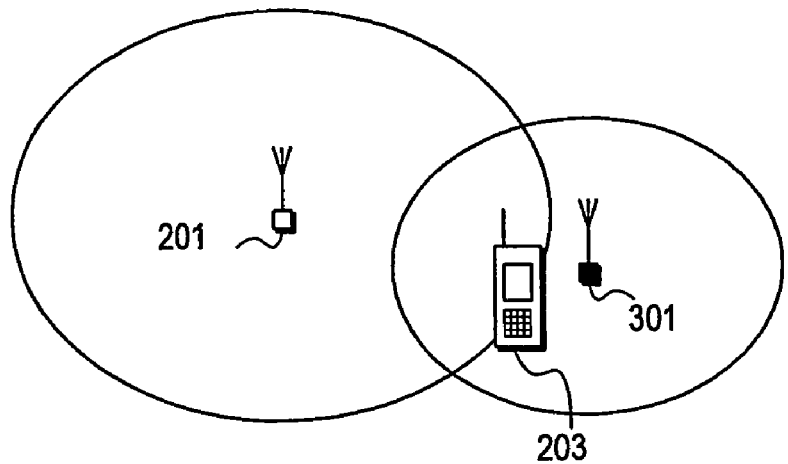
FIG. 3b presents some considerations related to overlapping cellular systems.

FIG. 3b illustrates schematically a situation where a competing telecommunication operator has set up a base station 301 of another system so that a mobile station 203 that is located relatively far from its serving base station 201 comes rather close to the competing base station 301. The authorities that are responsible for frequency allocation must give a different frequency (or a different set of frequencies) to the use of the competing operator. Although authorities allocate distinct frequencies for operators, due to imperfections for example in power amplifier linearity and in receiver filtering, transmitters in an adjacent channel may interfere in reception in the desired band. It may thus happen that the mobile station 203 sees the transmissions from the other base station 301 as interference.

The transmission power is controlled both in the uplink and in the downlink direction. In the downlink power control, for example, the mobile station may monitor the quality of the received signals, and based on these measurements request the cellular network to increase or decrease the transmission power. There are two basic methods to control power: the open loop power control and the closed loop power control. The open loop power control is typically applied when a new call is established and closed loop does not exist. The closed loop is used when radio links in both directions are established. In the closed loop, an outer loop algorithm is used to control quality of connection by setting target value for an inner loop of the closed loop power control.

Figure 4:
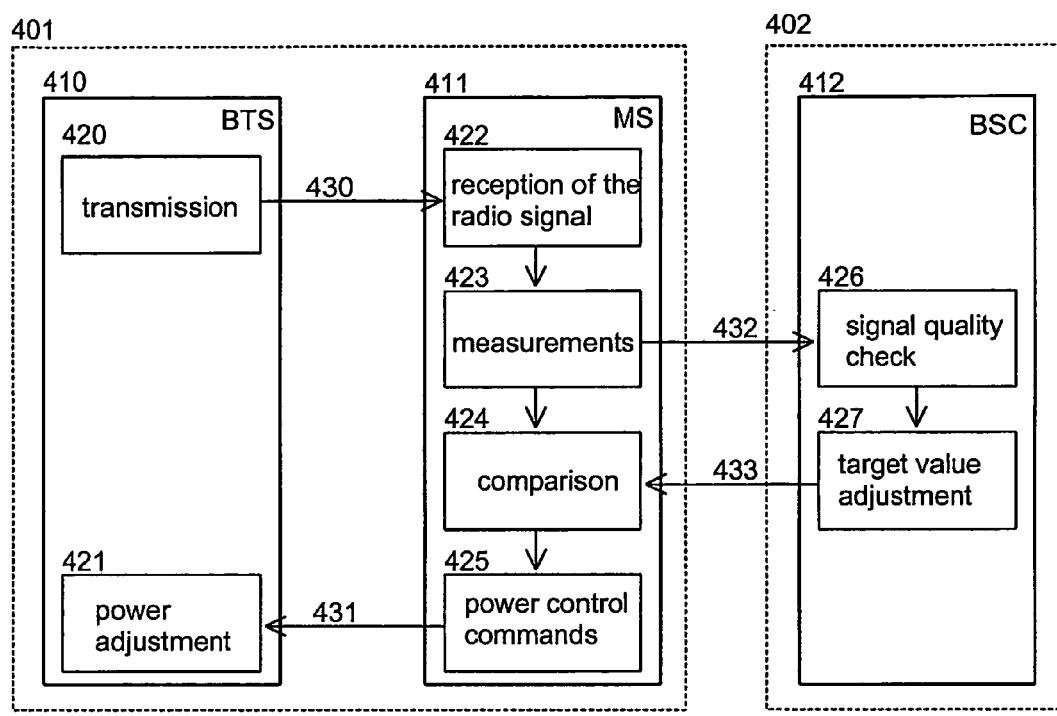
FIG. 4 illustrates schematically closed loop power control.

FIG. 4 illustrates schematically closed loop power control system. The inner loop 401 is in FIG. 4 implemented in a transmitter 410 and a receiver 411 equipment. For a downlink signal, the transmitter comprises a base station (BTS) and the receiver comprises a mobile station (MS). A radio signal (line 430) is transmitted from the transmitter to the receiver, and it is received in the receiver block 422. In the inner loop of a closed loop power control system, usually the signal to interference ratio SIR or some other quality factor F is determined and compared to a predetermined power control target value $F_{target,PC}$. This is presented in FIG. 4 with the measurement block 423 and the comparison block 424. The signal quality, or other chosen quantity, is sent from the measurement block 423 to the comparison block 424, where the measured quantity is compared to the target value. The target value is chosen so that, for example, the errors in the data transmitted over the radio channel are rare enough. If the signal quality is better than the target value, command to decrease the transmission power is sent from the power control command block 425. If the signal quality is too weak, the command to increase the power is sent. In the transmitter equipment, the power adjustment block 421 adjusts the transmission power used in the transmission block 420 according to the commands (presented by line 431).

The outer loop 402 of a closed loop power control system selects the target value for the inner loop. In FIG. 4 the outer loop is presented to be implemented in a separate network element 412, which is, for example, a radio network controller RNC in UMTS or a corresponding network element in another cellular radio communication system. Alternatively, the outer loop may be implemented in MS or in both MS and RNC. In the last case, the RNC typically has some control over MS outer loop power control. The outer loop monitors the quality of the received signal. This can be done, for example, by periodically sending frame error rate (FER) values to the outer loop. This is presented in FIG. 4 by line 432. The signal quality block 426 checks if the received signal quality is as good as needed. If needed, it adjusts the target value of the controlled variable in the target value adjustment block 427. The setting of a new target value for the controlled variable is presented in FIG. 4 with line 433.

Figure 5:
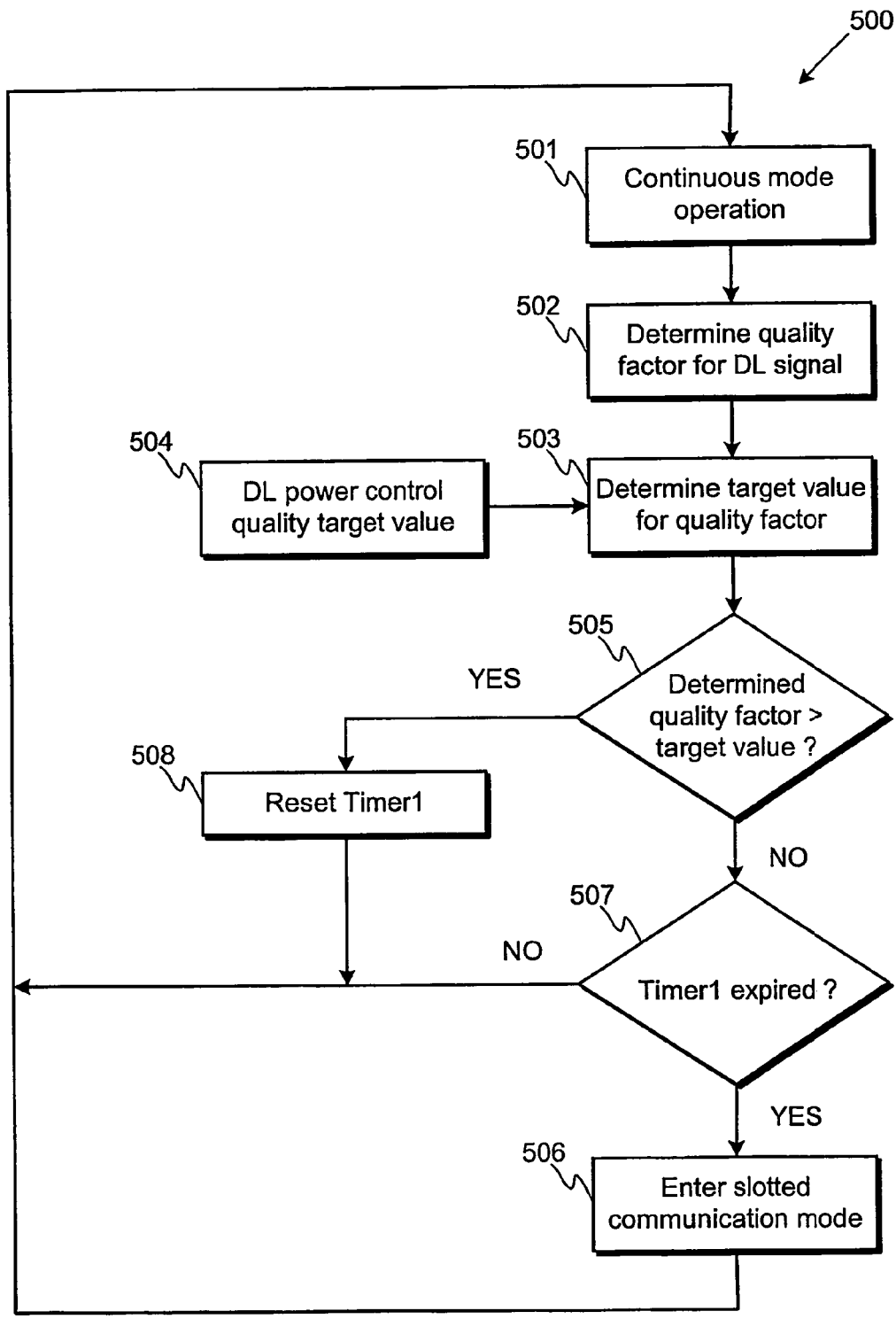
FIG. 5 illustrates a flowchart of a method according to a first preferred embodiment of the invention.

FIG. 5 illustrates a flowchart of a method 500 according to a first preferred embodiment of the invention. In step 501, a mobile station operates in a continuous mode. It typically measures the quality of the received downlink signal and determines a value for a quality factor F for the received signal (step 502), the quality factor F representative of the quality of the connection. This quality factor F may be, for example, the signal to interference ratio SIR or the energy per user data bit divided by the sum of the equivalent noise density and interference $E_b/(N_0+I_0)$.

Further examples of applicable quality factors are bit error rate (BER), Block Error Rate (BLER) or frame error rate (FER). In step 503 a target value $F_{target}$ for the quality factor is determined; this target value relates to handover decisions. In a method according to the embodied invention, this target value $F_{target}$ depends on the target quality factor $F_{target,PC}$ used in downlink outer loop power control; this is illustrated in FIG. 5 with step 504. In condition 505 it is checked, whether the quality, to which the determined quality factor F corresponds, is worse than the quality, to which the target value $F_{target}$ corresponds. If the quality of the received signal is adequate, i.e. typically $F>F_{target}$, operation in the continuous mode is continued. If the quality of the received signal is not adequate, the mobile station enters slotted mode communication, where it is possible to perform measurements, for example, on target frequencies, which are available for an interfrequency handover. Typically the cellular network needs to be informed about the entry to the slotted communication mode.

The target value $F_{target}$ may be equal to the target value $F_{target,PC}$ of the power control. Alternatively, $F_{target}$ may depend on $F_{target,PC}$. There may be, for example, a predefined fixed margin M (M>0) or a margin depending on $F_{target,PC}$, which is subtracted from the target value $F_{target,PC}$ to obtain $F_{target}$: $F_{target}=F_{target,PC}-M$ or $F_{target}=F_{target,PC}-M(F_{target,PC})$. Furthermore, there may be a function $f$ which bounds $F_{target}$ and $F_{target,PC}$ together: $F_{target}=f(F_{target,PC})$. Suitable function $f$ or suitable margins may be found, for example, using simulations.

A target value $F_{target,PC}$ may be updated, for example, for every radio frame or for every interleaving period. The target value $F_{target}$ may be updated, for example, as often as the target value $F_{target,PC}$ relates to the power control.

As discussed above in connection with FIG. 4, a mobile station may report measured quality factor values to the cellular network, where the values are compared to the target value. In this case, information about the power control target value is transmitted within the cellular network from power control system to interfrequency handover control system. If the mobile station itself controls the interfrequency handovers, the downlink outer loop power control target value is transmitted typically within a mobile station from a power control block to an interfrequency handover control block.

In addition to this functionality, method 500 comprises also steps 507 and 508. These steps relate to a more strict criterion for entering the slotted communication mode: for preventing unnecessary interfrequency handovers and especially unnecessary interference to other mobile stations, it may be required that the quality of the received signal is not adequate for a certain period of time. In FIG. 5 this criterion is checked using a timer called TIMER1. In method 500, this TIMER1 is reset, i.e. it is initialised and starts counting again typically from zero, each time the quality of the received signal is adequate (step 508). When the signal quality is not adequate, it is checked—before entering the slotted communication mode—whether TIMER1 has expired, i.e. whether it has reached a predetermined value (step 507). If TIMER1 has expired, the quality of the received signal has been worse than adequate for a certain predefined time period.

The use of TIMER1 illustrated in FIG. 5 in steps 507 and 508 is just one example of monitoring, whether the quality of the received signal is worse than the adequate for a certain predefined time period. In addition or alternatively to checking, whether the quality of the received signal is worse than the adequate for a certain predefined time period, it is possible to filter either the determined values for F or if, for example, a difference $F-F_{target}$ is used in comparing F and $F_{target}$, filter these differences.

It is possible that a mobile station is arranged to perform the method 500. Alternatively, it is possible that a mobile station reports the determined quality factors of the received downlink signal to the cellular network, and the cellular network performs steps 503-506. In step 506, the cellular network informs the mobile station about the entry to the slotted communication mode. The timer TIMER1, or other means having the same effect, may similarly be implemented either in a mobile station or in the cellular network.

Figure 6:
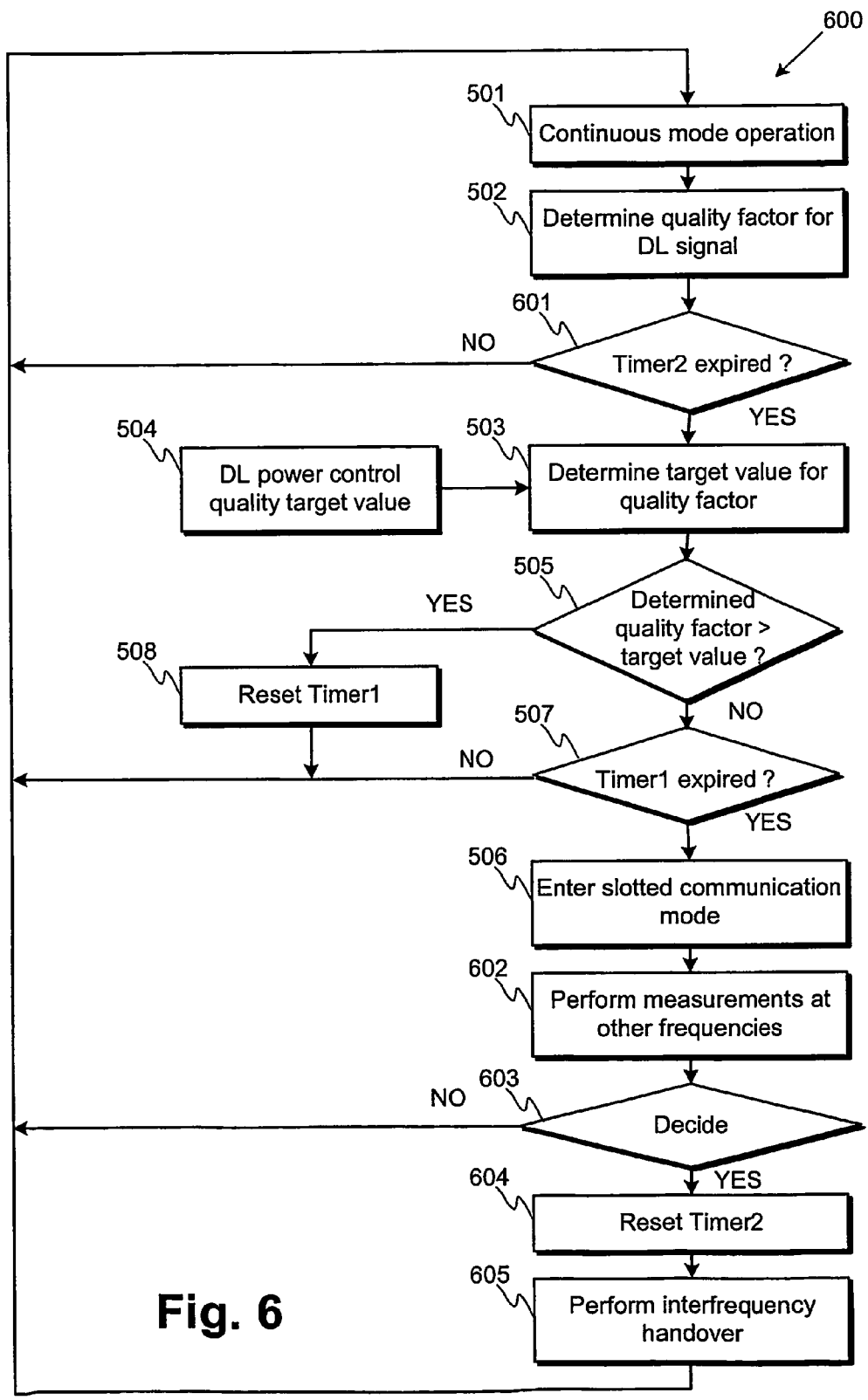
FIG. 6 illustrates a flowchart of a method according to a second preferred embodiment of the invention.

FIG. 6 illustrates a flowchart of a method 600 according to a second preferred embodiment of the invention. This method has the same steps 501-508 as method 500, but here further precautions for preventing unnecessary slotted mode communications and interfrequency handovers are applied. It is possible that immediately after an interfrequency handover is performed, the quality of the received signal is very poor. In method 600, a timer TIMER2 is used to prevent a new interfrequency handover relatively soon after an interfrequency handover is made. Similarly as TIMER1, TIMER2 is an example of how to check that a certain predefined time has lapsed since the latest interfrequency handover.

After a mobile station enters slotted mode communication in step 505, it performs measurements at other frequencies in step 602. Typically depending on the results of these measurements, a decision to perform an interfrequency handover is made in step 603. This decision may be made by the mobile station, in which case it requests from the cellular network an interfrequency handover. The cellular network typically finally decides about interfrequency handovers. Alternatively, the cellular network may command the mobile station to perform an interfrequency handover. When the interfrequency handover is initiated after a handover decision, TIMER2 is reset in step 604. After the interfrequency handover is performed in step 605 in a manner known well to a man skilled in the art, the mobile station enters the continuous operation mode in step 501. The quality of the received signal is typically determined, if not for other reasons, for the power control (step 502). Until a predetermined time period has lapsed since the latest interfrequency handover (TIMER2 expired in step 601), the determined quality factor of the received signal is not compared to a target value in method 600. The timer TIMER2 may be implemented either in a mobile station or in the cellular network. Preferably it is implemented at the same entity, which makes decisions about interfrequency handovers.

Figure 7A:
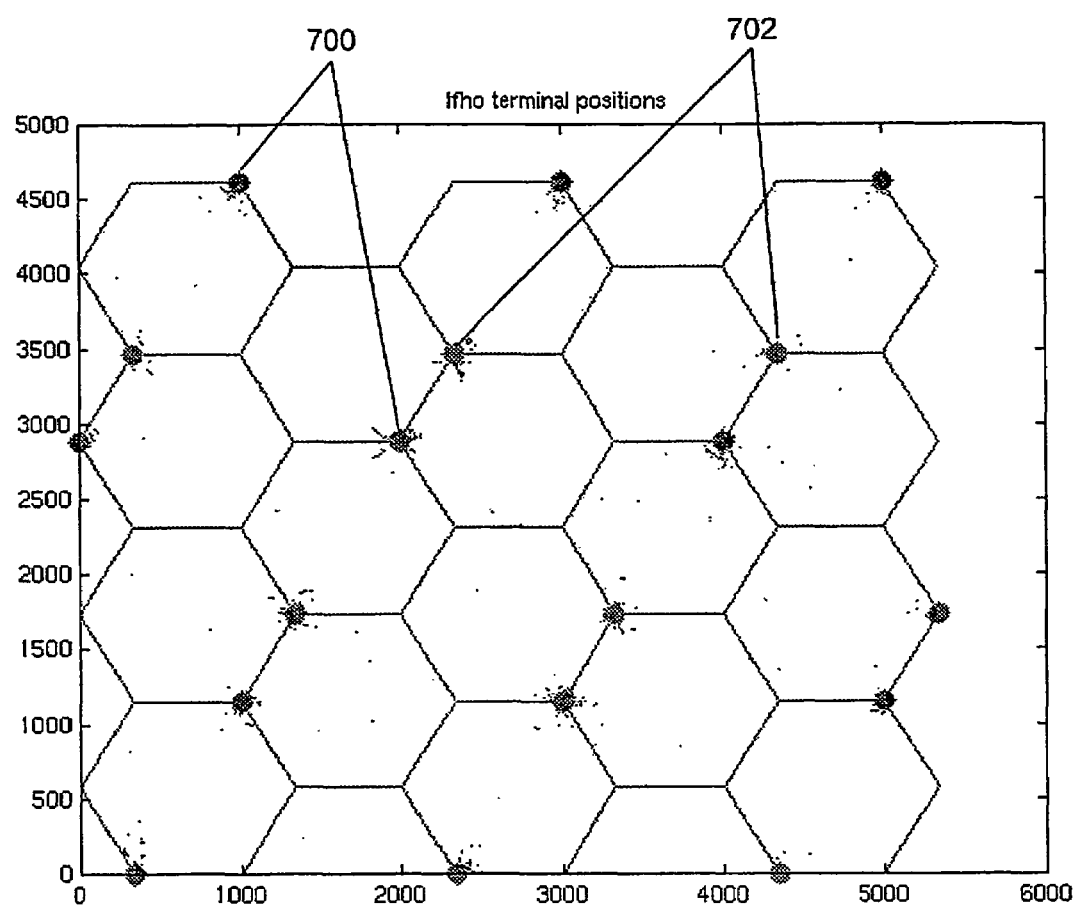
FIG. 7a illustrates results of an interfrequency handover simulation, where a method according to a preferred embodiment of the invention is applied, FIG. 7b provides a detailed view on the simulation results in FIG. 7a, FIG. 8 illustrates a flowchart of a method according to a third preferred embodiment of the invention.
Figure 7B:
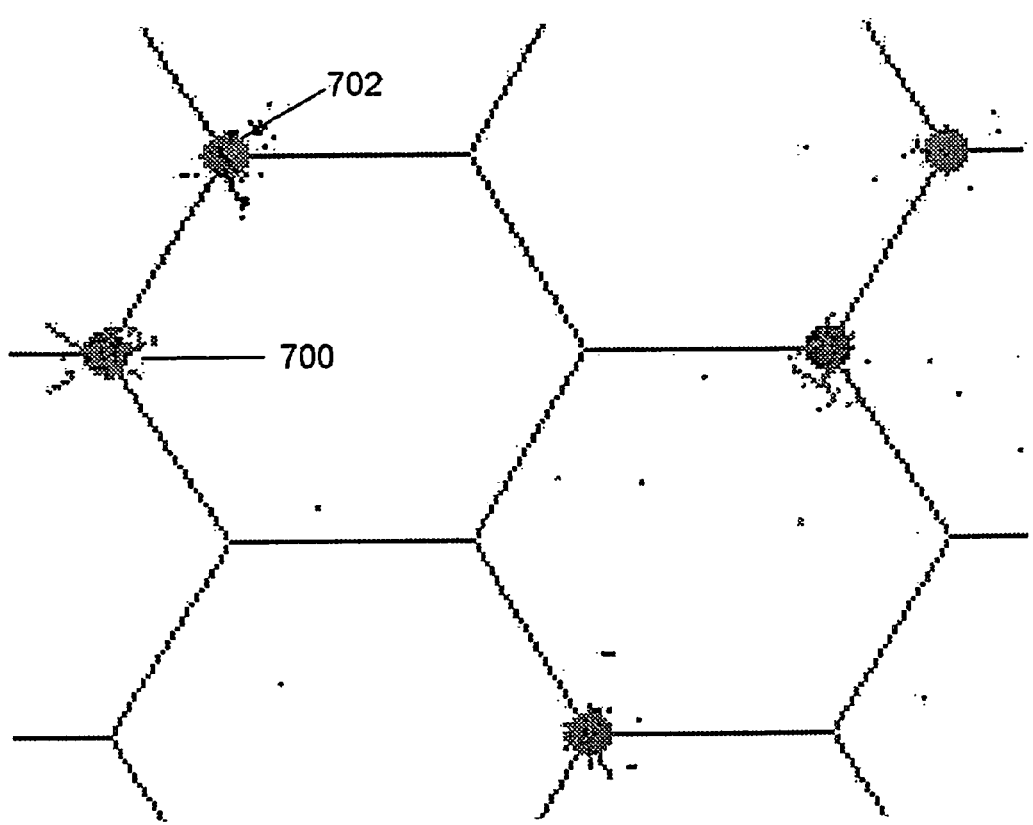

Results of a simulation, where a method according to one preferred embodiment of the invention is applied, are presented in FIGS. 7a and 7b and in Table 1. The simulation relates to a situation, where two cellular networks cover the same area. The base stations of these two cellular networks are illustrated in FIGS. 7a and 7b with dark gray (700) and light gray circles (702). The base stations of the first cellular network (dark gray circles; upmost row of base stations in FIG. 7a and every other row towards bottom of FIG. 7a) are at the border of the cells of the second cellular network (light gray circles) and vice versa. The method for controlling interfrequency handovers uses TIMER1, TIMER2, the measured signal qualities are filtered, and a target value dependent on the target value provided by the outer loop of a closed loop power control. Furthermore, the interfrequency handovers are blind, i.e. no compressed mode enabling synchronization to the target frequency is used (more detailed discussion on blind handovers is presented below). The margin, which is subtracted from target value $F_{target,PC}$ in this simulation, is 5 dB. The assumed delay in processing and signalling an interfrequency handover request resulting in an interfrequency handover is 140 ms, the measurement error in SIR measurement is 3 dB, and the SIR values are filtered using a time window of 500 ms.

Table 1 shows some simulation results proving the functionality of the presented method. Note that, even though simulation was made by adding delay in inter frequency handover execution and large error to inter frequency handover measurements, an interfrequency handover control method according to the invention gives clear advantage. When no interfrequency handover is performed, 3,5% of the uplink calls suffer from bad call quality. Partly this is due to own channel interference and partly due to adjacent channel interference. By using interfrequency handovers, the uplink call quality is improved: only 3,2% of call suffers from bad quality. In the downlink direction, the effect is stronger: the portion of downlink calls suffering from bad quality is decreased from 7.4% to 4,3% by using interfrequency handovers. This improvement in call quality can be used to serve a larger number of users or to enhance the quality of the same number of users.

TABLE 1

Simulation statistics

|  | Portion of bad quality call in uplink | Portion of bad quality call in downlink |
| --- | --- | --- |
| IFHO off | 3.5% | 7.4% |
| IFHO on | 3.2% | 4.3% |

FIG. 7a illustrates the simulation results. The locations, where interfrequency handovers are occurring, are marked with dark grey (700) and light grey points (702). As can be noted, interfrequency handovers of mobile stations being served by the first cellular network (dark gray circles and dark gray points) occur near the base station of the second cellular network (light gray circles), and vice versa. FIG. 7b illustrates a part of FIG. 7a enlarged. There typically is strong adjacent channel interference near a radio transmitter employing an adjacent frequency, and the target value of the quality factor may not be reached near such a transmitter. A method according to the preferred embodiments of the invention detects this situation and preparations for an interfrequency handover are typically initiated and handovers are performed. The handover control method in the simulation efficiently aids in escaping adjacent channel interference. Furthermore, there are practically no interfrequency handovers farther away from a base station of the other cellular network. Unnecessary interfrequency handovers are not caused, at least not when a load in a cellular network is reasonable.

Poor transmission quality of a communication connection at a certain frequency may be related, for example, to one or more of the following reasons: the frequency channel is crowded with other communication connections of the same cellular radio network and this causes interference; the mobile station is near cell border and the transmission power is near or at maximum value, but this is not enough to provide desired transmission quality; or a base station of a second cellular radio network (or other radio transmitter) transmits at an adjacent frequency and causes interference at the frequency of the communication connection. An interfrequency handover does not always help in situations, where the quality of the communication connection is poor. Preparatory measurements for an interfrequency handover may even worsen the situation for other communication connections, for example, when there is not present a radio transmitter at an adjacent frequency, but the own frequency is simply crowded and there are no less-crowded frequencies available. It is possible that measurements on other frequencies than the one, on which a mobile station is currently communicating with the serving base station, help to make a decision about an interfrequency handover more accurate.

Figure 8:
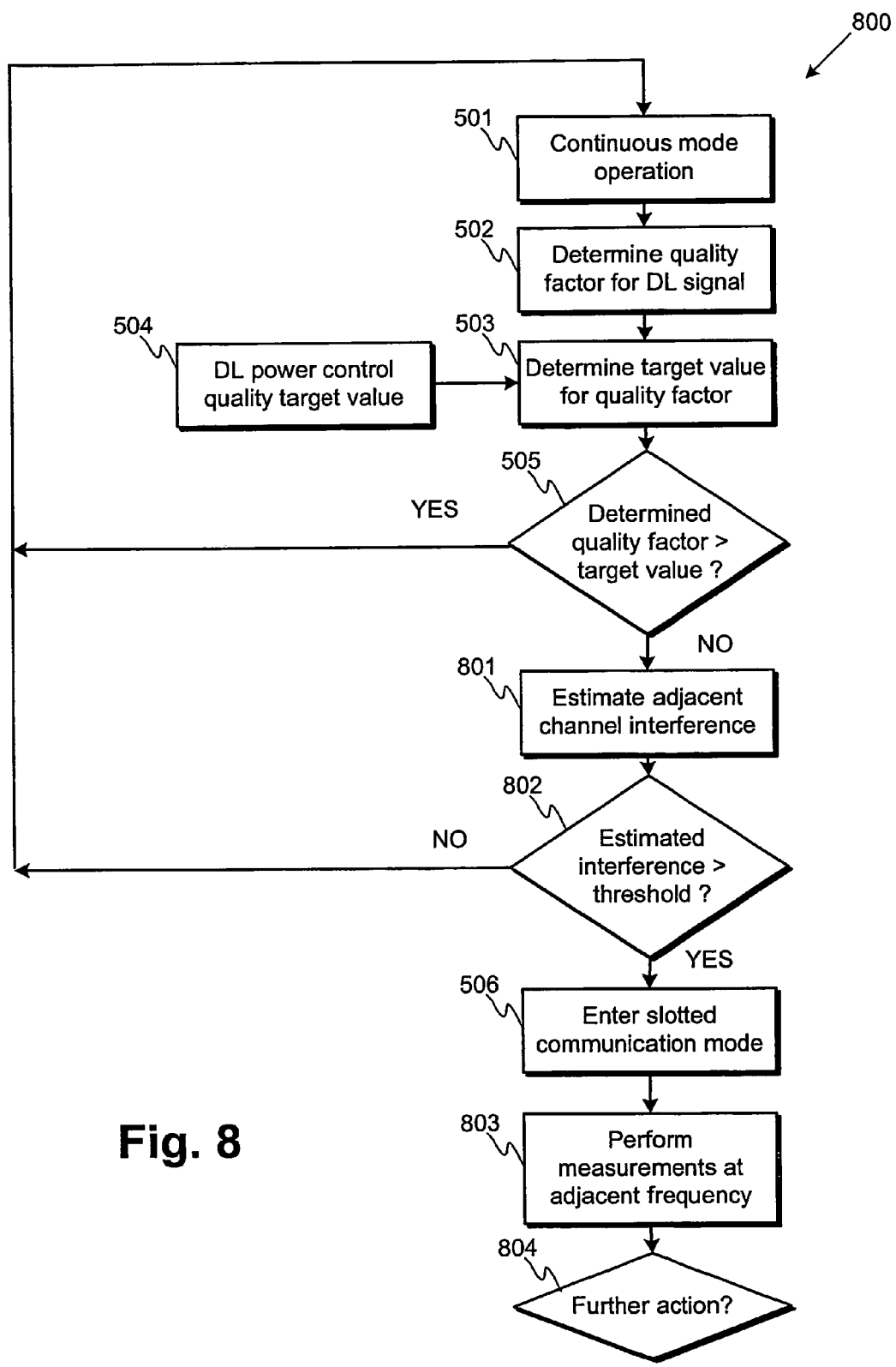

FIG. 8 illustrates a flowchart of a method 800 according to a third preferred embodiment of the invention. In this method, adjacent channel interference is estimated (step 801) and this estimated adjacent channel interference has to exceed a predetermined threshold (step 802), before slotted communication mode is entered. If the adjacent channel interference, i.e. interference typically caused by a radio transmitter located possibly nearby and using an adjacent frequency, is high, an interfrequency handover may be a way to escape the experienced high interference.

The mobile station may estimate the amount of non-orthogonal narrowband interference coming from transmissions on adjacent channels. The mobile station may, for example, first use a known path loss principle to estimate the co-channel non-orthogonal interference, i.e. the power component in the output of the despreading unit that is associated with other simultaneous spread spectrum transmissions from "own" base stations. Such a known path loss principle is disclosed in the patent publication WO 01/31958 A1, incorporated herein as a reference. By subtracting from the total output power of the despreading unit the actual signal power, the estimated co-channel non-orthogonal interference and the internal and external thermal noise components the mobile station finds the non-orthogonal narrowband adjacent channel interference.

The threshold value for a "high" level of non-orthogonal narrowband adjacent channel interference is advantageously determined as a relative value, i.e. as a certain fraction of the current narrowband actual signal power. The most appropriate value of that fraction is found by experimenting and/or simulating. The non-orthogonal narrowband adjacent channel interference does not need to be explicitly calculated. The mobile station may monitor the total level of narrowband interference and compare it against an estimate of what the co-channel non-orthogonal interference should be, taken the current path loss value. Therefore, it is possible to alternatively determine total non-orthogonal narrowband interference in step 801 and compare it to an estimated co-channel non-orthogonal interference in step 802.

If interference is found to be too high (step 802), slotted communication mode is entered in step 506. In step 803 measurements on adjacent channels are performed during the slotted communication mode. Adjacent channel interference maybe measured by performing wideband interference measurements in the channel that is the assumed source of adjacent channel interference. For example RSSI (Received Signal Strength Indicator) measurements may be done in the adjacent channel. If wideband interference level in the adjacent channel exceeds a target level, interfrequency handover is initiated directly or measurements on available target frequencies are initiated (further action in step 804). Otherwise, it is possible that 1) the poor signal quality is related to the own channel just being crowded or that 2) the mobile station is loosing coverage. In the first option, an interfrequency handover to a less crowded frequency typically helps, so measurements at available target frequencies resulting in an interfrequency handover may be initiated. If the mobile station is loosing coverage, an intercell handover, which may be an interfrequency handover, typically helps in situations, where the new frequency is less crowded or if current frequency was interfered by another operator adjacent channel interference.

When the actual interfrequency handover (IFHO) takes place, it can be blind (no synchronization is made prior the actual the interfrequency handover) or synchronization may be performed before the interfrequency handover. If the IFHO is made blindly, long synchronization period (up to approximately 10 ms) that takes place after the IFHO decision may cause a clip to the call if the synchronization is lost. Also dropping probability maybe higher. In a blind interfrequency handover a mobile station jumps to a new frequency without making any preparations for the handover using compressed mode. If the mobile station does not remain synchronized after the handover (i.e. the synchronization in the new frequency is not same or very close to that in the old frequency), the mobile station first performs synchronization. During this synchronization a mobile station cannot transmit or receive any data.

It is advantageous to perform synchronization before the actual IFHO. If a mobile station enters a slotted communication mode for performing measurements at available target frequencies, it may also perform synchronization with base station during the slotted communication mode, before IFHO decision.

Figure 9:
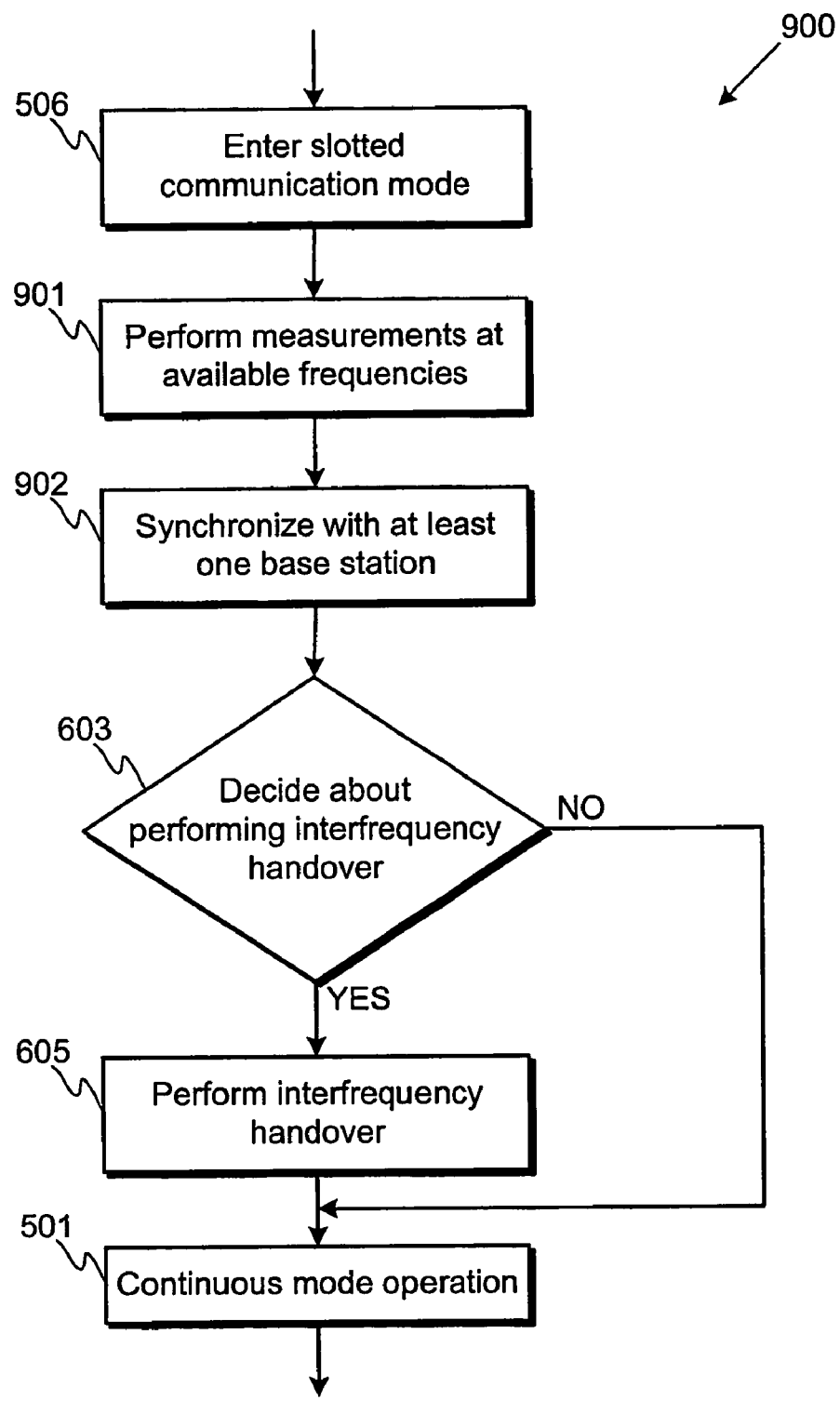
FIG. 9 illustrates a part of a flowchart of a method according to a fourth preferred embodiment of the invention.

FIG. 9 illustrates a part of a flowchart of a method 900 according to a fourth preferred embodiment of the invention. This method typically comprises the steps 501-505 illustrated in FIG. 5, although they are not shown in FIG. 9. In method 900, measurements at available target frequencies are performed in the slotted communication mode (step 901). Synchronization with at least one base station is performed in step 902. In step 605 the interfrequency handover is performed after a decision to make interfrequency handover in step 603.

Figure 10:
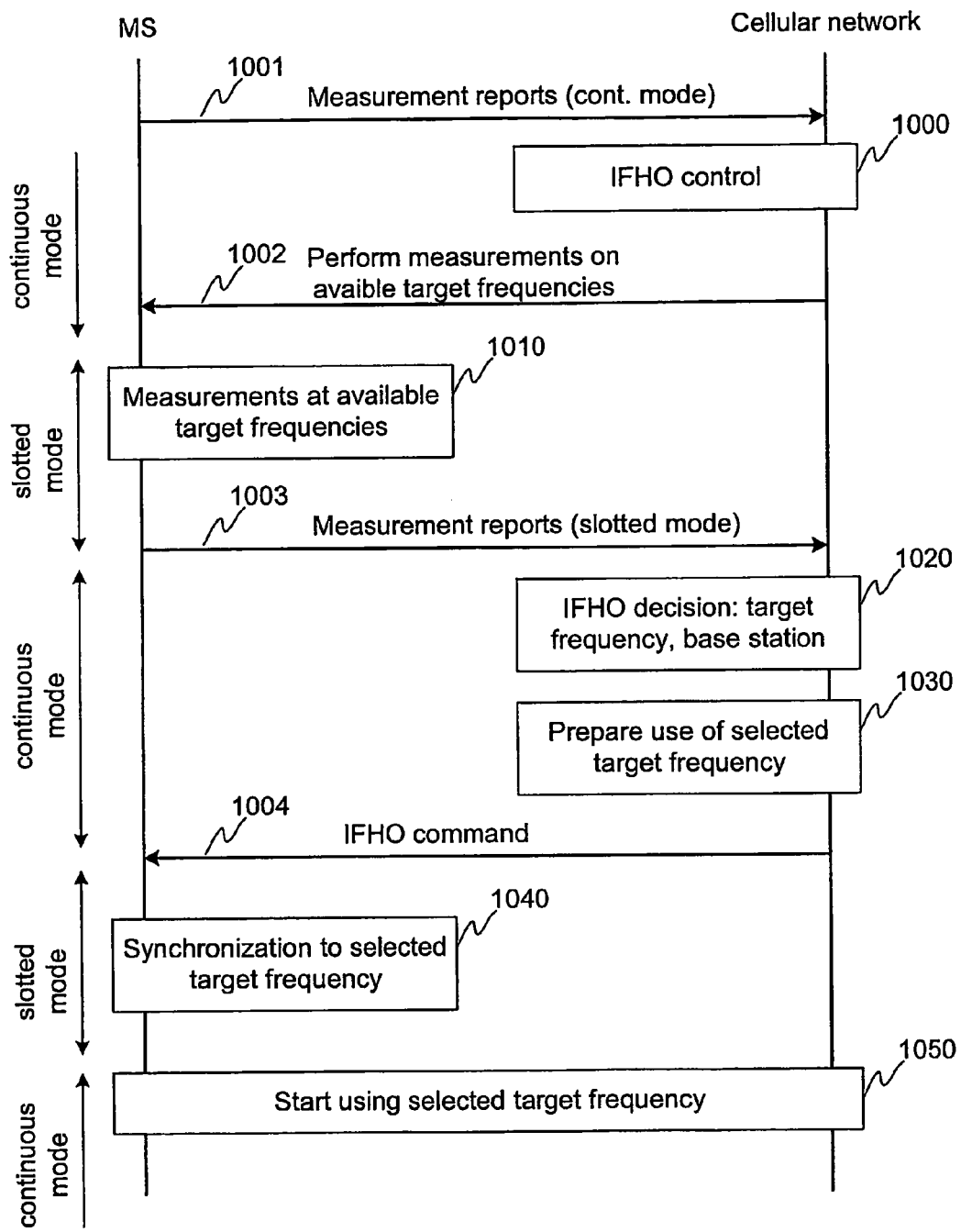
FIG. 10 illustrates schematically one interfrequency handover, where the invention is applicable.

FIG. 10 illustrates schematically one example of an interfrequency handover, where the cellular network makes decisions about interfrequency handovers. During continuous mode operation a mobile station sends (arrow 1001) to the cellular network information about the current received signal quality in measurement reports. Interfrequency handover control is performed (1000) in the network, for example using a target value of a downlink outer loop power control as a target value in controlling interfrequency handovers. At a suitable time, the cellular network instructs the mobile station to perform measurements at available target frequencies (arrow 1002). Typically the cellular network informs the mobile station about the available target frequency or frequencies. The mobile station enters slotted communication mode and performs measurements (1010) at least at one available target frequency. The mobile station sends measurement reports about the measurements at available target frequencies to the cellular network (arrow 1003). The cellular network makes the interfrequency handover decision (1020), i.e. it selects the target frequency and the target base station, and prepares the use of the selected target frequency (1030) in the relating cellular network elements (typically at least at the target base station and/or the target base station controller or radio network controller). This preparation typically lasts about 100-200 ms. Typically thereafter the cellular network sends to the mobile station an interfrequency command (arrow 1004). The mobile station may continue operation in the slotted mode during steps 1020 and 1030, or it may enter continuous communication mode after it has performed the measurements 1010. After the mobile station receives the interfrequency command 1004, it performs synchronization (1040) with the selected target base station at the target frequency in slotted communication mode. Once the synchronization step 1040 is complete, the mobile station and the network start to communicate using the selected target frequency 1050.

A mobile station may communicate with a number of base stations simultaneously, i.e. its active set may consist of a number of base stations. The synchronization to the new frequency is performed in FIG. 10 after the decision to change to a new frequency has been made. As it may take a very long time before synchronization to all base stations belonging to an active set is ready, the handover illustrated in FIG. 10 is typically a hard handover. This can mean that even if before the change of frequency a mobile station communicates with a number of base stations, only one target base station is selected. The active set, i.e. the base stations with which a mobile station currently communicates before the handover, can be lost in a hard handover.

The handover illustrated in FIG. 10 may alternatively be a blind handover. In practice, this means that the interfrequency handover is typically an intracell handover, i.e. the source base station is the same as the target base station and only the frequency changes. Typically, the synchronization at different frequencies, which a certain base station uses, is quite similar. Therefore, it is possible to make an intracell interfrequency handover blindly, which means that the synchronization 1040 in the slotted mode is not performed. The mobile station and the network simply start to communicate using a selected target frequency. If needed, a mobile station makes correction to the synchronization in a continuous communication mode at the new frequency after the step 1050. In a blind intefrequency handover there can be a risk that the synchronization at different frequencies is very different. In this case the synchronization in the continuous mode may last longer than expected and cause a clip to the call. The synchronization may take up to about 10 ms or even more. Furthermore, the dropping probability in a blind handover may be larger than in a handover, where synchronization 1040 is made prior to taking the selected target frequency into use. Blind handover, on the other hand, removes the need for the extra slotted communication mode period during the synchronization 1040 before taking the new frequency into use. As discussed above, in some cases after a blind interfrequency handover a synchronization using compressed mode is however needed after the new frequency is taken into use.

In FIGS. 10-11 and in the flowcharts details about changing the communication modes between a slotted mode and a continuous mode are not presented for reasons of clarity. Typically the cellular network and mobile station need to agree on these changes or at least be informed that the other party of the communication is going to change communication mode.

Figure 11A:
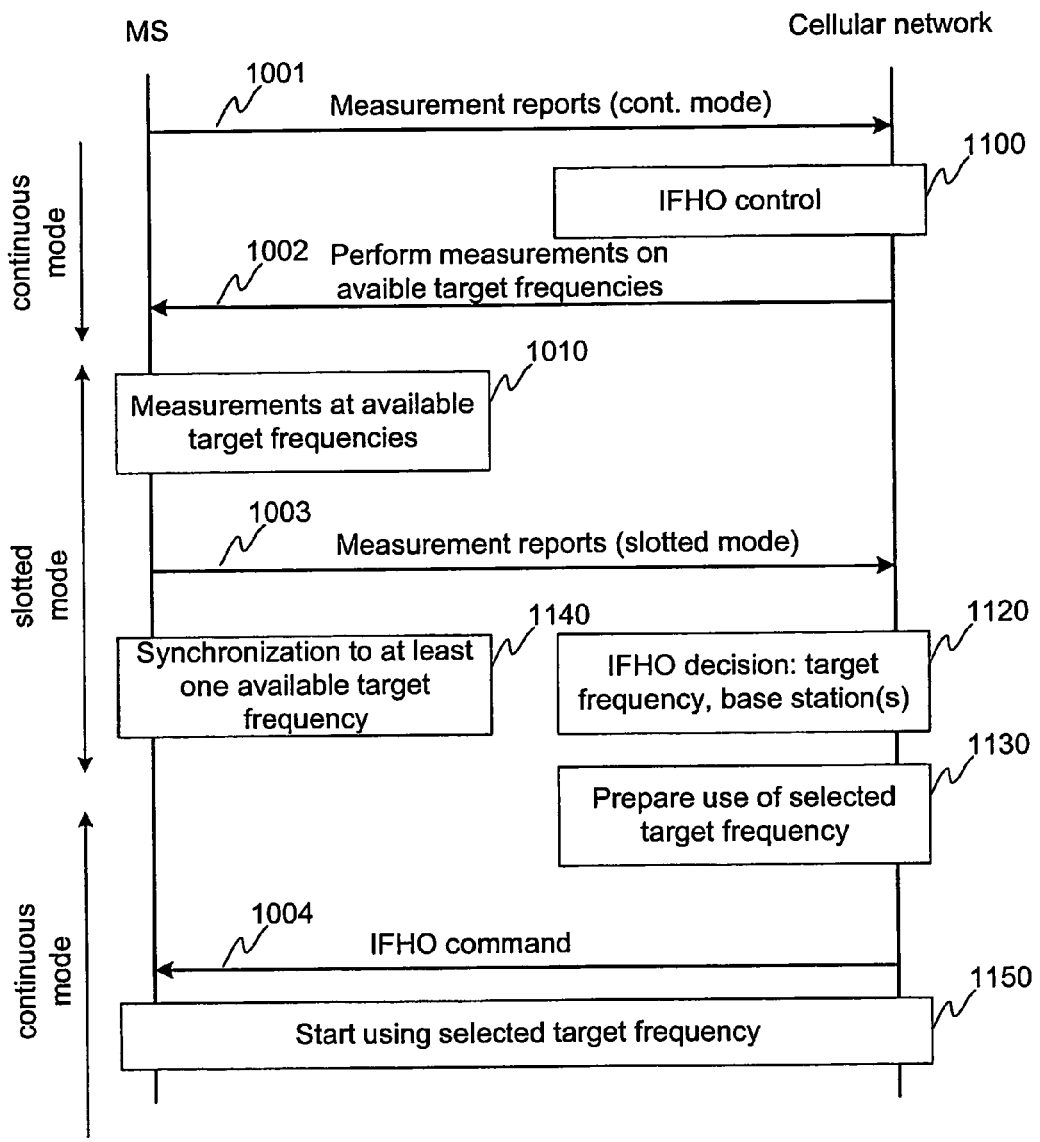
FIG. 11a illustrates schematically further interfrequency handovers, where the invention is applicable.
Figure 11B:
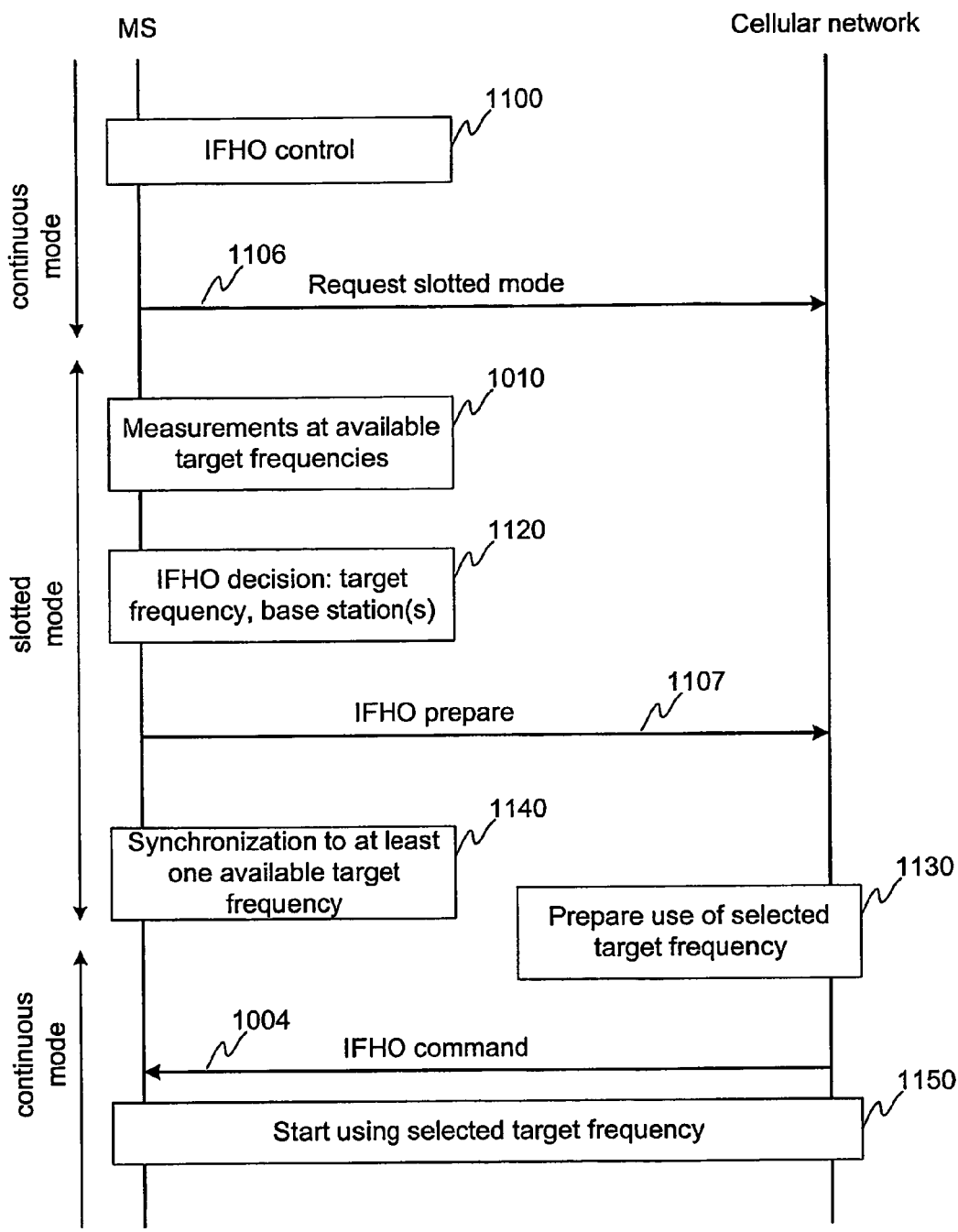
FIG. 11b illustrates schematically further interfrequency handovers, where the invention is applicable.
Figure 11C:
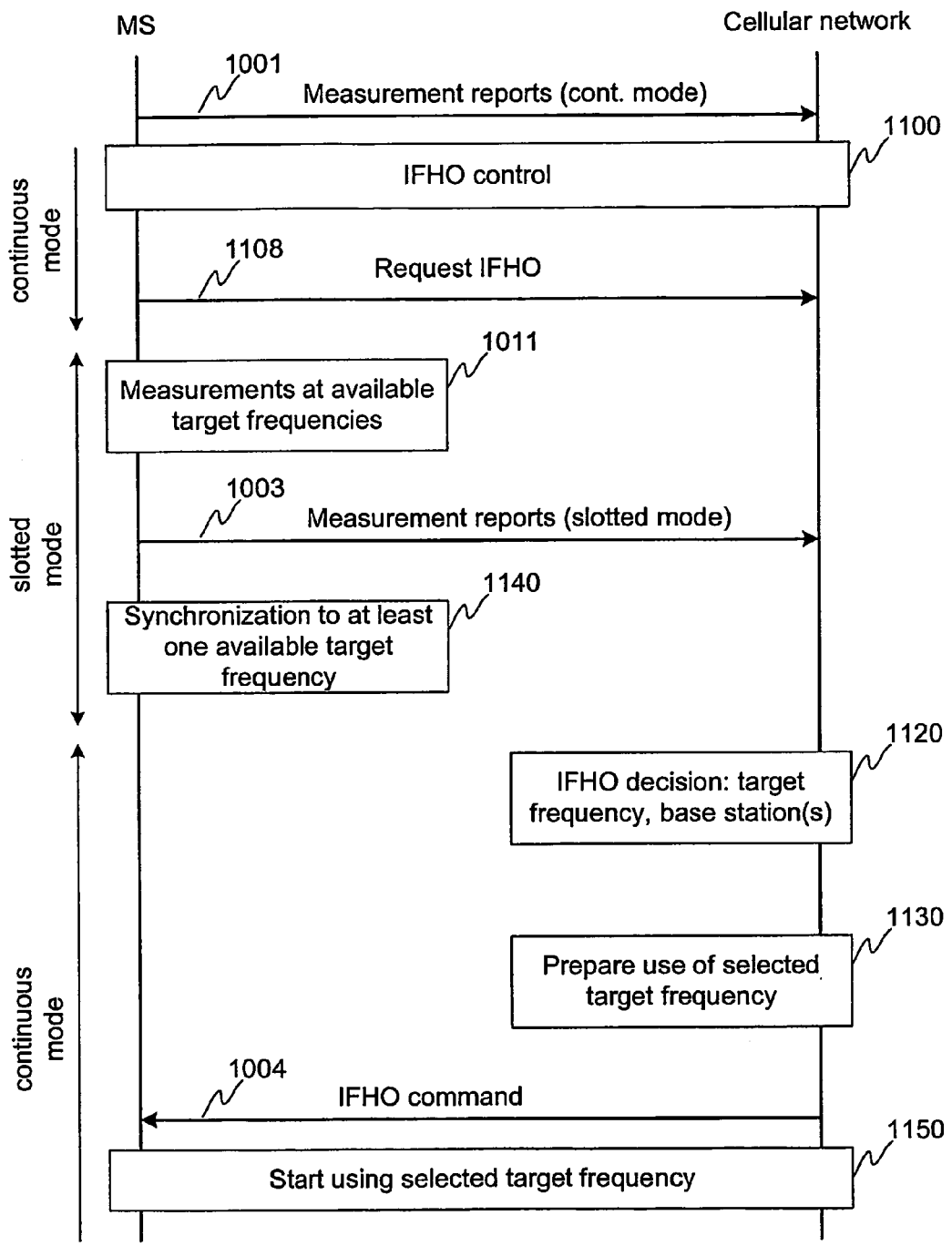
FIG. 11c illustrates schematically further interfrequency handovers, where the invention is applicable.

FIGS. 11a, 11b and 11c illustrate further examples of interfrequency handovers, where synchronization to at least one available target frequency is made before a decision to make a handover has been made. It is advantageous to perform the synchronization while waiting for the cellular network to decide about the IFHO and/or to prepare the use of a selected target frequency (or frequencies). When a decision is made to take a new frequency into use, the new frequency may be taken into use practically immediately. When synchronization is made after a network sends an IFHO command (as illustrated in FIG. 10) it may take up to hundreds of milliseconds to perform synchronization to all base stations in the active set. Only thereafter the new frequency may be taken into use. In many cases it may be important to be able to take the new frequency into use as fast as possible. Typically, a mobile station decides to perform or prepare an IFHO, when it notices problems due to adjacent channel interference. If the preparation of IFHO takes too much time, it may happen that the adjacent channel interference becomes so bad that quality of the connection deteriorates or—even worse—the connection drops.

FIG. 11a illustrates an interfrequency handover, which is otherwise similar to the handover illustrated in FIG. 10, but the synchronization is made before a mobile station receives an interfrequency handover command. As the mobile station is using the slotted communication mode for performing measurements at available target frequencies 1010, it may perform synchronization 1140 while in the slotted communication mode. The measurements at an available target frequency typically require slot synchronization, so it is quite straightforward to perform fame synchronization (which is required for the handover), for example, in connection with the slot synchronization and measurements at the available target frequencies. Alternatively, it is possible that the mobile station chooses, for example based on the measurement results at the available target frequencies, at which frequencies it performs synchronization. In this case the synchronization is performed typically after the measurements. Furthermore, it is possible that a mobile station performs synchronization with more than one base station. It may, for example, perform synchronization with all base stations belonging to its active set at one or more available target frequencies. Once the measurements 1010 and synchronization 1140 are performed, a mobile station may enter continuous communication mode in the current frequency and wait for an interfrequency handover command 1004 from the cellular network. When it receives this command, the selected target frequency may be immediately taken into use 1150.

As the synchronization 1140 is performed before the selected target frequency is taken into use, it is possible to make a soft handover. This means that the interfrequency handover decision 1120 may involve the selection of a number of target base station, instead of selecting only one target base station as in handover decision 1020. For example, the active set of a mobile station may be retained. Based on measurement in the target frequency, active set involving several base station that differs to the existing base stations can also be established.

It may be that the cellular network decides not to perform an interfrequency handover in phase 1120. In this case, the mobile station simply enters (or remains, if it already entered) the continuous communication mode and continues to use the current frequency. The synchronization 1140 was, in this case, performed in vain, but it typically does not cause a significant increase in interference or other harm, when compared to simply performing measurements 1010.

FIG. 11b illustrates an interfrequency handover, where the interfrequency handover control 1100 is performed in a mobile station, similarly as interfequency handover decisions 1120 are made in a mobile station. In this case the mobile station does not necessarily send measurement reports to the cellular network, at least not for reasons relating to handover control and decisions. Instead, when the mobile station determines to enter slotted mode, it requests the use of slotted communication mode from the cellular network (arrow 1106). After entering slotted communication mode, the mobile station typically performs measurements at available target frequency or frequencies 1010, makes the interfrequency handover decision 1140 and requests the cellular network to prepare for an interfrequency handover (arrow 1107). After informing the cellular network, the mobile performs synchronization 1140 at the selected target frequency with selected base station(s) and the cellular network prepares the use of the selected target frequency 1130. The cellular network typically indicates to the mobile station, for example using an interfrequency handover command 1004, when it is time to take the selected target frequency into use.

FIG. 11c illustrates an interfrequency handover, where the interfrequency handover control 1100 is implemented partly in the mobile station and partly in the cellular network. The mobile station draws conclusions about the measurements it performs in the continuous mode, and requests an interfrequency handover from the cellular network (arrow 1108). Thereafter the mobile station enters slotted communication mode and performs measurements 1010 and synchronization 1140 at available target frequency/frequencies.

The interfrequency handover control 1000 and 1100 may employ the idea of using such a target value for a quality factor, which target value depends on the target value of downlink outer loop power control. The idea of performing synchronization before a decision to make an interfrequency handover is made may, alternatively, be implemented with other interfrequency handover control methods. The names of the signaling messages (such as IFHO command, IFHO prepare or request IFHO) are given as illustrative examples only. In cellular networks corresponding functionality may naturally be implemented using signaling messages having different names.

Figure 12:
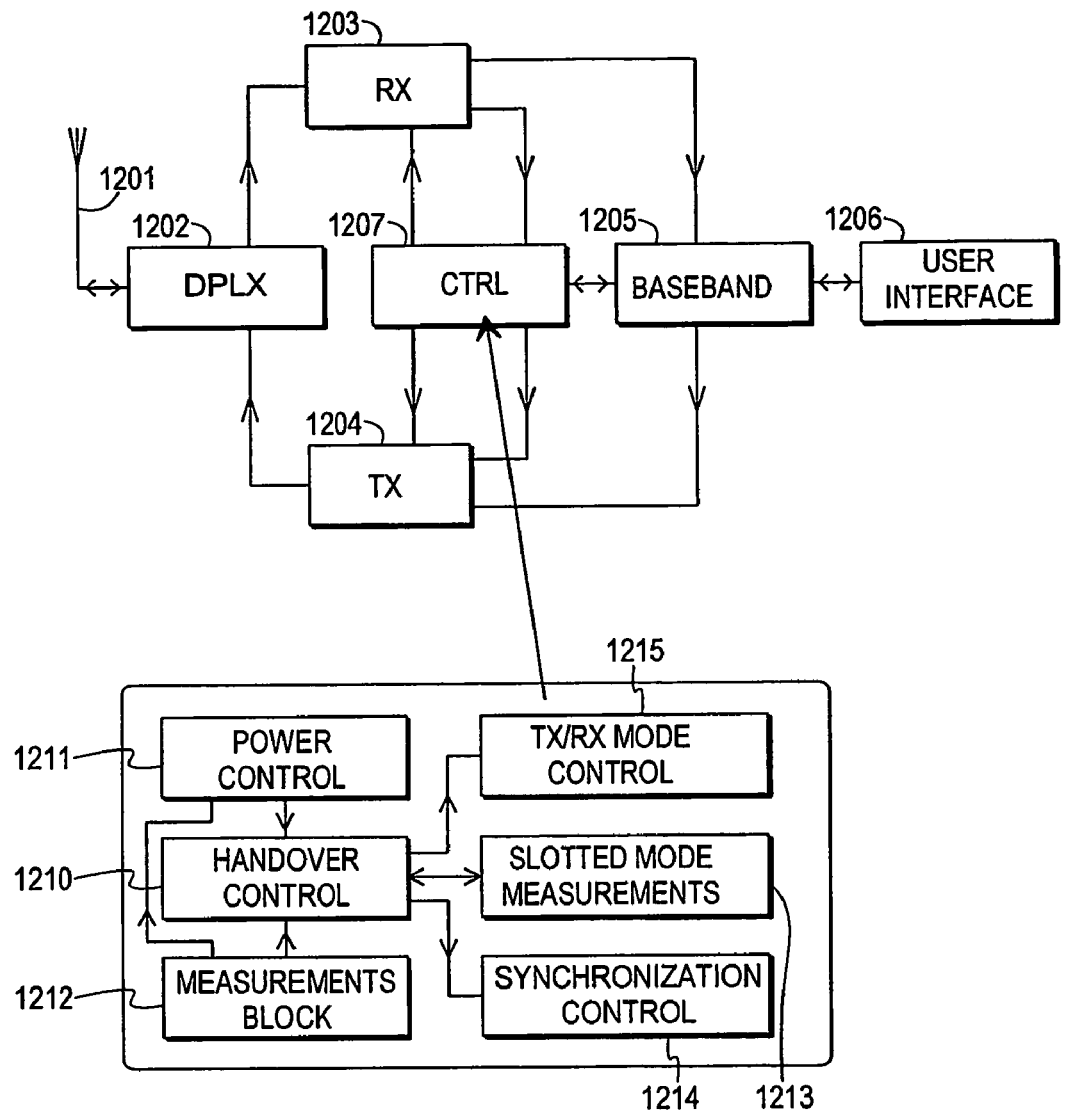
FIG. 12 illustrates a mobile station according to an embodiment of the invention.

FIG. 12 illustrates a mobile station according to an embodiment of the invention. An antenna 1201 is coupled through a duplexing block 1202 to a receiver block 1203 and a transmitter block 1204. The sink of payload data from the receiver block 1203 and the source of payload data to the transmitter block 1204 is a baseband block 1205 which in turn is coupled to a user interface block 1206 for communicating with a human or electronic user. A control block 1207 receives control information from the receiver block 1203 and transmits control information through the transmitter block 1204. Additionally the control block 1207 controls the operation of the blocks 1203, 1204 and 1205.

The control block comprises, among others, an intefrequency handover control block 1210. A power control block 1211 provides information about the quality factor target value of the downlink outer loop power control to the interfrequency handover control block 1210. A measurement block 1212 provides quality factor values determined for the received signal advantageously both to the power control block 1211 and to the interfrequency handover control block 1210. Alternatively, there may be separate measurement block relating to these functionalities.

The interfrequency handover control block 1210 gives to a TX/RX mode control block 1215 information based on which the block 1215 control the transmit and receive modes. The interfrequency handover control block 1210 also provides information to the slotted mode measurements block 1213, which is responsible for performing measurements on other frequencies. These other frequencies may be adjacent frequencies or available target frequencies. The block 1213 typically sends information about the measurement results to the block 1110. Furthermore, there is a synchronization control block 1214, which is responsible for performing synchronization to target frequencies. The synchronization is performed either after an interfrequency handover decision or before it, in the latter case typically during measurements at available target frequencies.

The mobile station (MS) may be under coverage of a certain base station (BS). When the interfequency handover is completed, the certain BS can be applied in the communication after the interfrequency handover. Also, when the interfrequency handover is completed, another base station (BS) can be applied as well in the communication after the interfrequency handover procedure has taken place.

It is possible that in a mobile station having blocks 1210, 1212, 1213, 1214 and 1215, the interfrequency handover control block 1210 employs other criteria for initiating interfrequency handover preparations that those relating to the downlink outer loop power control target value.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A method for controlling interfrequency handovers of a mobile station, the mobile station comprising a continuous communication mode and a combined slotted communication mode and measurement mode, the method comprising:
changing the operation of the mobile station into the combined slotted communication mode and measurement mode for preparing an interfrequency handover, if at least a criterion specifying that a quality of a downlink signal relating to a channel on which communication takes place between the mobile station and a mobile communication system in the continuous communication mode is worse than a quality represented by a first target value, is fulfilled, and updating the first target value at first time instants of those time instants at which a second target value is updated by the power control manner of the transmission power, wherein the first target value depends on the second target value, the second target value being related to an outer loop power control of a transmission power of the downlink signal.

2. A method according to claim 1, wherein the first target value is updated for every radio frame.

3. A method according to claim 1, wherein the first target value is updated for every interleaving period.

4. A method according to claim 1, wherein the first target value is equal to the second target value.

5. A method according to claim 1, wherein the first target value corresponds to a worse quality than the second target value.

6. A method according to claim 1, wherein the value for the quality represented by a first target value is determined for every time slot.

7. A method according to claim 1, wherein a further criterion specifies that the criterion is to be fulfilled for a certain first predetermined time period.

8. A method according to claim 1, further comprising: estimating adjacent channel interference on the channel on which communication takes place in the continuous communication mode.

9. A method according to claim 8, wherein said adjacent channel interference is estimated, if the determined value for the quality represented by a first target value is below a predetermined value.

10. A method according to claim 8, further comprising: measuring interference on an adjacent channel in the combined slotted communication and measurement mode.

11. A method according to claim 1, further comprising: performing an interfrequency handover to a second channel, and after entering a continuous mode in the second channel, inhibiting a further interfrequency handover for a certain second predetermined time period.

12. A method according to claim 1, further comprising: performing preparatory measurements for an interfrequency handover in the combined slotted communication mode and measurement mode.

13. A method according to claim 12, comprising: in the combined slotted communication mode and measurement mode, synchronizing the mobile station with at least one base station before selection of a target frequency and/or the target base station(s) for the interfrequency handover.

14. A method according to claim 13, further comprising: sending a request for the interfrequency handover to the cellular radio system from the mobile station, and wherein synchronization is performed after sending the request.

15. A method according to claim 13, further comprising: triggering, based on said preparatory measurements, the synchronization of the mobile station with the at least one base station.

16. A method according to claim 13, wherein the mobile station is synchronized in at least one available target frequency with each base station relating to which said preparatory measurements are made.

17. A method according to claim 13, wherein the mobile station is synchronized in at least one available target frequency with at least two base stations.

18. A method according to claim 17, wherein said at least two base stations belong to the active set of the mobile station.

19. A method according to claim 18, wherein the synchronization is performed with all base stations belonging to the active set of the mobile station.

20. A method according to claim 18, further comprising: performing the interfrequency handover to all base stations belonging to the active set of the mobile station.

21. A method according to claim 17, comprising: performing the interfrequency handover to said at least two base stations.

22. A method according to claim 1, wherein the loop based power control manner is adapted to control the quality of the connection by setting the target value for an inner loop of a closed loop power control.

23. An apparatus for controlling interfrequency handovers of a mobile station comprising a continuous communication mode and a combined slotted communication mode and measurement mode, comprising:
a control block for changing the operation of the mobile station into the combined slotted communication mode and measurement mode for preparing an interfrequency handover, if at least a criterion specifying that a quality of a downlink signal relating to a channel on which communication takes place between the mobile station and a mobile communication system in the continuous communication mode is worse than a quality represented by a first target value, is fulfilled, and a target value adjustment block for updating the first target value at first time instants of those time instants at which a second target value is updated by the power control manner of the transmission power, wherein the first target value depends on the second target value, the second target value being related to an outer loop power control of a transmission power of the downlink signal.

24. An apparatus according to claim 23, further comprising: a synchronization control block for synchronizing the mobile station with a base station, said synchronization control block arranged to perform the synchronization during the combined slotted communication and measurement mode before selection of a target frequency and/or a target base station(s) for an interfrequency handover.

* * * * *